United States Patent [19]

LaCourse et al.

[11] 4,303,446

[45] Dec. 1, 1981

[54] FIBERIZABLE GLASS

[75] Inventors: William C. LaCourse, Alfred; Terence J. Clark, Alfred Station, both of N.Y.

[73] Assignee: Borg-Warner Corporation, Chicago, Ill.

[21] Appl. No.: 185,074

[22] Filed: Sep. 8, 1980

[51] Int. Cl.$^3$ .................. C03C 13/00; C03C 3/04; C03C 3/08
[52] U.S. Cl. ........................................ 501/35; 501/65
[58] Field of Search ............................. 106/50, 52, 54

[56] References Cited

PUBLICATIONS

Morey G. W.; *The Properties of Glass*, 2nd Edition, Reinhold Publishing Corp., 1954, pp. 401 and 402.

Primary Examiner—Earl C. Thomas
Assistant Examiner—Mark Bell
Attorney, Agent, or Firm—Joseph Shekleton

[57] ABSTRACT

A lead-free, fiberizable glass composition. The glass is characterized by a relatively low hardness rating and is accordingly useful in preparing friction surfaces. Its composition includes, on a weight basis, from about 45% to about 75% of silicon dioxide, from about 15% to about 30% of potassium oxide and from about 2% to about 10% of magnesium oxide.

3 Claims, No Drawings

FIBERIZABLE GLASS

This invention relates as indicated to a fiberizable glass composition. More particularly it relates to such a fiberizable glass composition which is characterized by low hardness and is, therefore, especially adapted for use as a frictional material.

Present day frictional materials invariably incorporate asbestos as an important component. The reason for this is that asbestos is characterized by many of the properties which are useful in the formulation of a good frictional material such as a brake lining or clutch surface. It is chemically and biologically inert, it is fibrous, it has about the right degree of hardness, the right coefficient of friction with ferrous metals, and it is cheap. For these reasons, asbestos has been a mainstay of frictional materials in industry in general and in particular, in the automotive industry.

In the recent past, however, the continued use of asbestos has come under a cloud because of the realization that it presents a serious cancer hazard for those who work with it. There has been an increasing concern about such hazard with the result that the expense of health precautions now required for the safe handling of asbestos has become a significant burden. Accordingly, it has now become desirable to eliminate asbestos from frictional material formulations and to find a replacement.

The fiberizable glass composition of the present invention is, as indicated, characterized by low hardness and is, therefore, especially adapted for use as a frictional material. It is a lead-free glass having low hardness properties comprising from about 55% to about 75% of silicon dioxide, from about 15% to about 30% of potassium oxide and from about 2% to about 10% of magnesium oxide. It will be seen that there are three distinguishing characteristics of this glass: (1) it is lead-free, (2) it is fiberizable, and (3) it has low hardness. All of these tend to make it a suitable substitute for asbestos in frictional materials.

U.S. Pat. No. 4,142,906 (Iizawa) shows a glass composition useful as a reinforcing fibrous glass for cement. It contains 30-57% of silicon dioxide, 12-26% of zirconium oxide, 14-26% of an alkali metal oxide, 1-11% of a calcium, barium, magnesium, zinc or cobalt oxide, 0.1-6% of calcium fluoride, 0.-10% of an alkali metal fluosilicate, 0.1-12% of baron oxide, and smaller amounts of titanium oxide, aluminum oxide and ferric oxide. The zirconium oxide contributes a high-melting character to the glass.

U.S. Pat. No. 3,966,481 (Atkinson et al) also shows a fiberizable glass. It contains 46-56% of silicon dioxide, 6-12% of boron oxide, 12-17% of aluminum oxide or ferric oxide, 13-24% of calcium oxide and 2-6% of zirconium oxide. Very little, if any, potassium is included.

U.S. Pat. No. 3,687,850 (Gagin) shows a glass fiber mat comprising long, staple fibers which are useful as high temperature insulating materials. The composition of the glass includes 45-60% of silica, 12-18% of aluminum oxide, 4-10% of boron oxide, 16-26% of calcium and/or magnesium oxide and up to 2% of alkali or potassium oxide. It will be noted that very little if any potassium is present whereas a rather large proportion of magnesium is included.

U.S. Pat. No. 3,764,283 (Hagedorn) deals with the opalization of certain glass compositions. These compositions comprise 55-76% of silicon dioxide, up to 5% of potassium oxide, 10-30% of combined calcium oxide and magnesium oxide, and up to 13% of boron oxide; minor proportions of various other ingredients are also included.

U.S. Pat. No. 3,844,800 (Hooton) discloses an invention which is related to frictional materials used in braking loads having considerable ranges of kinetic energy. Those frictional materials contain 25-80% by volume of a metallic powder which may be copper, iron, nickel or mixtures thereof, up to 30% by volume of aluminum oxide, crystalline silicon oxide, mullite, kyanite, sillimanite, cordierite, forsterite or mixtures thereof, up to 32% by volume of graphite and 1-50% by volume of silicate glass powder particles. A soda-lime glass is shown (in Table IA) having 72% silica, 15% sodium oxide, 9% of calcium oxide and small proportions of potassium oxide and magnesium oxide.

Other qualities desirable in an asbestos substitute for frictional materials, include resistance to moisture, a relatively high softening temperature, i.e., about 350° C., freedom from toxic ingredients and low cost. Unfortunately, as is the usual case, all of these properties are not easily consistent with one another in one composition. The presence of lead in a glass composition, for example, is effective to give to that glass composition a relatively low hardness, but lead is of course a toxic material. Even though lead glass has been used as tableware for many years without poisonous effects, the present milieu of fear relative to cancer and the environment suggests avoidance of any and all potentially poisonous materials. Thus, lead is out.

So also, with silicon dioxide. It is the principal ingredient of all commercially important glasses because it provides strength. At the same time, however, it also provides hardness and it will be recalled that a low hardness is desired for the present invention.

The glass composition of the present invention contains silicon dioxide as its principal ingredient. As noted above, its concentration is limited at the lower end of the scale, by the requirement for strength and at the upper end of the scale, by the requirement for low hardness. Less than a 45% concentration results in a glass having little strength while more than 75% contributes unduly to hardness. Also, too much silicon dioxide causes the melting point of the glass to be too high which makes it difficult to melt and work.

Ordinary soda glass contains a substantial proportion of sodium oxide which gives the glass a reduced melting point, but also a reduced chemical durability, i.e., increased solubility in water. Instead of sodium oxide, the glass compositions herein contain potassium oxide, which makes the glass softer. The concentration of potassium oxide should be within the range of from about 15% to about 30%. More than this is undesirable because it tends to increase the hardness; that is, the potassium oxide imparts decreased hardness up to a concentration of about 30% whereas at higher concentrations just the opposite effect is noted.

Whereas calcium oxide ordinarily is used to counter effects caused by the presence of sodium oxide, it also causes increased hardness and thus must be avoided in the glasses of the present invention. Instead, magnesium oxide is used. It is effective to decrease the hardness of the glass, and also to provide increased chemical durability. Concentrations of from about 2% to about 10% are contemplated.

In many instances the above glass composition will contain up to about 25% of boron oxide which also is effective to provide increased chemical durability and to reduce hardness. Zinc oxide may also be used, in concentrations ranging up to about 10%.

Fiber preparation can be accomplished either by blowing or drawing. Blown fibers, for testing purposes, are prepared by directing a blast of compressed air at a molten stream of glass. Fibers up to 12 inches long can be obtained in this fashion. Drawn fibers are simply pulled from a molten stream onto a wind-up reel. The method of preparing fibers is not a critical part of this invention and any of several well-known techniques may be employed.

The glasses herein, as indicated, are characterized by a relatively low hardness. The term "hardness" refers to the susceptibility of the glass surface to indentation when it is subjected to a diamond-pointed load of 100 grams. A 100% silicon dioxide glass has a Vicker's Hardness rating of 710 kg/mm$^2$. The lead-free glasses of the present invention have corresponding ratings less than about 550 kg/mm$^2$. Hardness determinations of glass are discussed in some detail in "Vicker's Hardness of Glass" by Yamane et al, J. Non-Crystalline Solids, 15 (1974), 153–164.

The softening point of the glasses herein is within the range of from about 450° C. to about 625° C. The highest temperature at which a glass can be used, without risking thermal deformation of the glass surface, is generally about 75° C. below the softening point and this use requirement is an important factor in fixing the lower limit of this softening point range. The upper limit is based largely on the ease of manufacturing the glass; a low melting glass is easier to manufacture than a high melting glass simply because less heat is required. The softening point is determined on an Orton Recording Dilitometer, using a 2-inch long specimen and a heating rate of 4° C./minute. The softening point is the temperature at which the glass becomes soft enough that a push rod attached to an LVDT transducer penetrates the sample.

Durability is also a factor, i.e., the property of the glass to withstand dissolution in water. This is determined either by noting the increase in pH of a glass powder (of uniform size)-water mixture, or by noting the weight loss of a glass sample after immersion in water for a period of time. The durability of the glasses herein is equal to or superior to that of ordinary soda lime glass.

Inasmuch as the glass herein is lead-free, its density is relatively low for a glass of low hardness. The density is below 3.0.

The glasses of the invention may be made in a globar electrical furnace in a platinum crucible, at temperatures up to about 1450° C. A melt time of 24 hours is satisfactory. Raw materials may be ordinary laboratory grade oxides or carbonates of the desired element, depending on availability.

The compositions of the invention are illustrated in more detail in Table I, where there are set forth the concentrations of the various components of several glasses.

TABLE I

|   | $SiO_2$ | $K_2O$ | MgO | $B_2O_3$ | ZnO |
|---|---|---|---|---|---|
| 1. | 63.6 | 24.1 | 6.5 | 5.7 | — |
| 2. | 61.5 | 23.3 | 3.2 | 5.5 | 6.5 |
| 3. | 67.9 | 18.2 | 5.7 | 8.0 | — |
| 4. | 58.1 | 21.5 | 5.8 | 14.7 | — |
| 5. | 49.0 | 25.6 | 5.4 | 21.1 | — |
| 6. | 59.2 | 21.8 | 6.2 | 5.1 | — |
| 7. | 68.9 | 20.7 | 5.9 | 4.9 | — |

The data in Table II illustrates the physical properties of the above glasses, with respect to softening point, hardness, and relative durability. The test samples are those identified in Table I.

TABLE II

|   | Softening Point (OC) | Hardness (kg./mm$^2$) | Durability |
|---|---|---|---|
| 1. | 620 | 435 | E* |
| 2. | — | 490 | — |
| 3. | — | 530 | — |
| 4. | — | 480 | E |
| 5. | — | 500 | E |
| 6. | — | 440 | E-S** |
| 7. | — | 440 | E-S |

*Equal to soda lime glass
**Equal or Superior to soda lime glass

The lead-free glass compositions of the invention may in certain instances also contain minor proportions (up to 5%) of other metal oxides including, for example, sodium oxide, barium oxide, iron oxide, etc.

All parts and percentages herein, unless otherwise expressly stated, are by weight.

We claim:

1. A fibrous, lead-free glass having low hardness properties consisting essentially, on a weight basis, of from about 45% to about 75% of silicon dioxide, from about 15% to about 30% of potassium oxide and from about 2% to about 10% of magnesium oxide.

2. The glass of claim 1 which additionally contains up to about 25% of boron oxide.

3. The glass of claim 1 which additionally contains up to about 10% of zinc oxide.

* * * * *